United States Patent [19]

Cross

[11] Patent Number: 4,569,530
[45] Date of Patent: Feb. 11, 1986

[54] CHUCK JAW AND MOUNTING THEREFOR
[75] Inventor: Kenneth O. Cross, Utica, Mich.
[73] Assignee: N. A. Woodworth Company, Detroit, Mich.
[21] Appl. No.: 622,000
[22] Filed: Jun. 18, 1984
[51] Int. Cl.[4] .............................. B23B 5/22; B23B 5/34
[52] U.S. Cl. ...................................... 279/123; 279/121
[58] Field of Search ........................ 279/112, 121, 123

[56] References Cited
U.S. PATENT DOCUMENTS
3,542,386 11/1970 Becker ................................ 279/121

FOREIGN PATENT DOCUMENTS
2153662 5/1973 Fed. Rep. of Germany ...... 279/123
2214861 6/1973 Fed. Rep. of Germany ...... 279/121

Primary Examiner—Douglas D. Watts
Attorney, Agent, or Firm—John P. O'Brien; T. W. Buckman

[57] ABSTRACT

A top jaw adapted for mounting on and attachment to the master jaw of a conventional work holding chuck and simultaneously during attachment thereof to be located radially against a fixed stop by a double T-nut of unique configuration, the latter being movable by an actuator screw in T-slots provided in the jaws, one portion of the T-nut and the complementary T-slot in the top jaw in which it is mounted being inclined with respect to and sloping toward the interface between the top and master jaws so that tightening of the T-nut by the actuator screw forces the top jaw radially against the stop and simultaneously axially against the mating surface of the master jaw, the taper angle of T-nut and the lead angle of the screw threads mutually cooperating to lock the top jaw on the master jaw in use.

18 Claims, 9 Drawing Figures

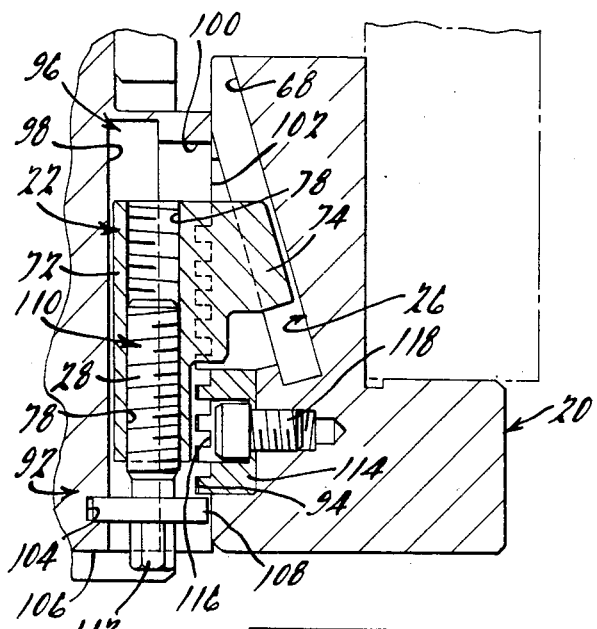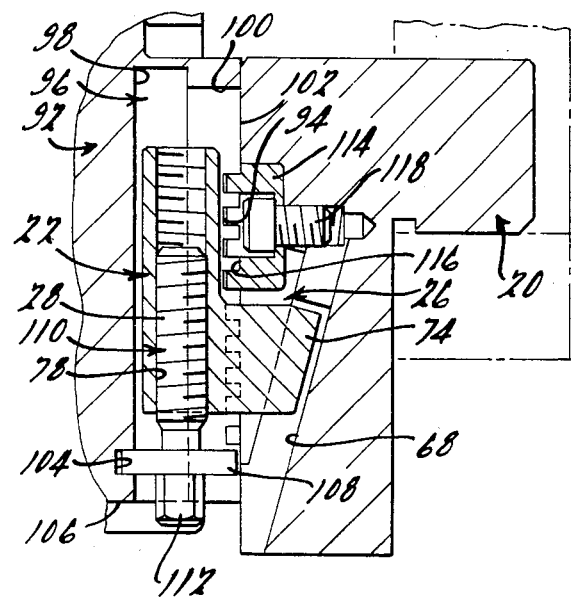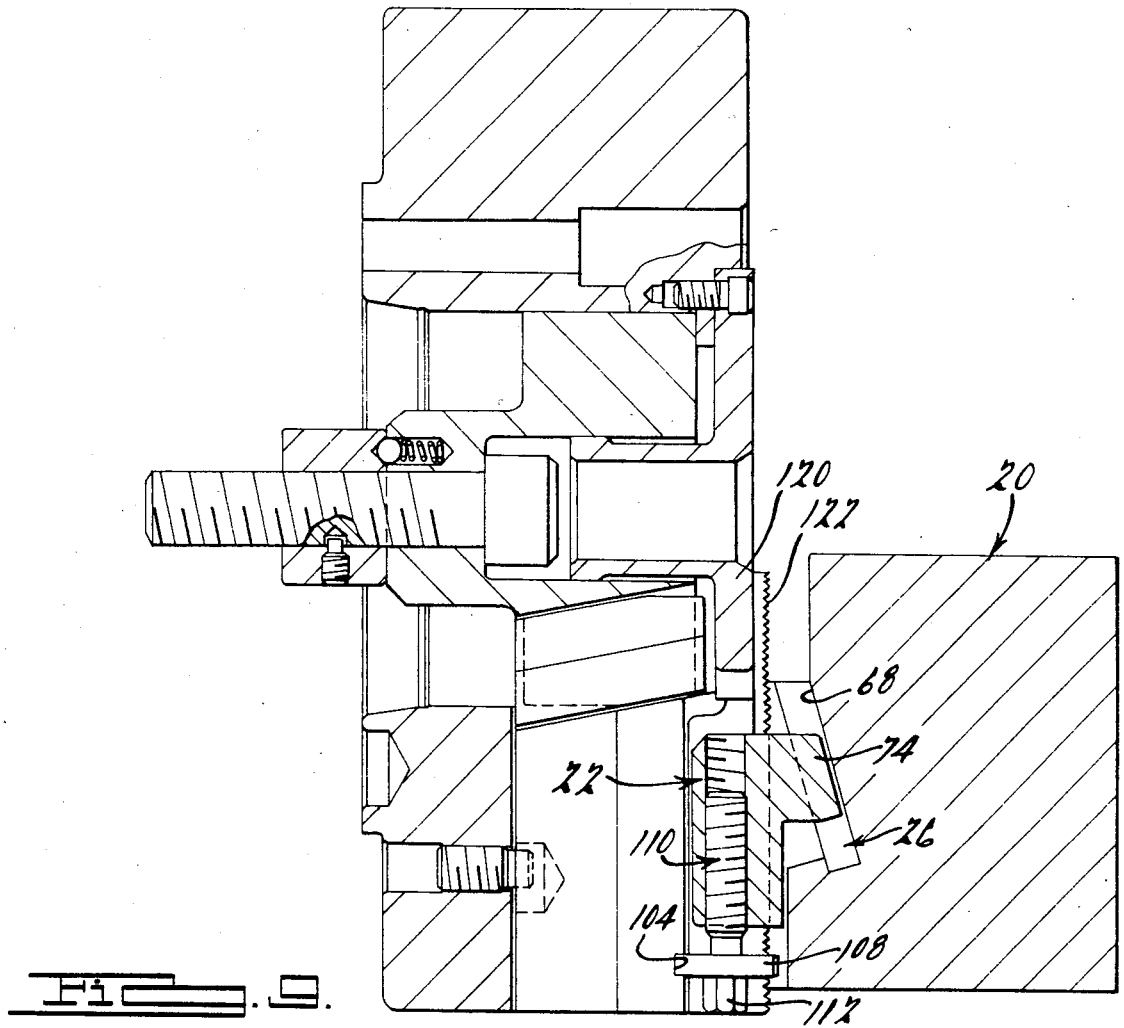

CHUCK JAW AND MOUNTING THEREFOR

BACKGROUND OF THE INVENTION

In work holding chucks of the type having replaceable top jaws mounted on and detachably fastened to master jaws, it is conventional to fasten the top jaws by hold-down screws that may extend through holes in the top jaws and into T-nuts disposed in radial T-slots provided in the master jaws, or alternatively, by hold-down screws that typically spread split dovetail members in dovetail slots. In the case of the dovetail arrangement, the fact that the hold-down screws extend through holes in the top jaws reduces to that extent at least the area of frictional engagement between the dovetail members and the slots. Also, in both of these constructions, the T-slots or dovetail slots as the case may be extend radially of the master jaws so that, when the hold-down screws are loosened, the top jaws can be adjusted radially in accordance with the size of workpiece to be held thereby.

Precise radial positioning of the top jaws conventionally is achieved by set screws at one end or the other of the jaws. In these chucks, the top jaws are held primarily, if not entirely, by friction between the T-nuts or dovetail members and the slots. Consequently, any loosening of the hold-down screws in use due to vibration or otherwise results in a lessening of clamping pressure that may cause the work to fly out of the chuck and result in possible injury to persons and damage to equipment in the vicinity of the chuck.

Top jaws mounted and secured in the manner described above are replaceable so that the chuck can be adapted for different kinds and forms of workpieces. However, the jaw change operation is tedious and time consuming since it requires that all of the hold down screws be removed and then replaced. Since the screws and other parts of the jaw assemblies are completely disassembled they are liable to be misplaced or even lost during the changeover operation. Further, while the adjustable stops permit limited radial adjustment of the top jaws for different diameter workpieces, the adjustment is time consuming since the chuck has to be tested for runout after each adjustment.

Thus, there is a need in the art for a top jaw mounting that holds the top jaws securely in use but that also permits them to be easily and quickly removed and replaced.

SUMMARY OF THE INVENTION

The present invention provides a novel form of top jaw mounting that utilizes a double T-nut having T-portions disposed in confronting T-slots in the top and master jaws. The master jaw T-slot and the T-portion of the T-nut disposed therein extend at right angles to the chuck axis. However, the top jaw T-slot and its T-portion are inclined with respect to the chuck axis disposed and in converging relation with respect to the interface between the two jaws. An axially stationary but rotatable screw in the master jaw extends through the T-nut; and, when this screw is tightened, it draws the inclined T-portion of the T-nut solidly against the inclined T-slot to urge the top jaw radially against a fixed stop and simultaneously to force the top jaw solidly in an axial direction against the master jaw. Ideally, the angle of inclination of the T-portion and T-slot last referred to is substantially the locking angle of the material from which the jaw is made so that the inclined T-portion mutually cooperates with the helix angle of the actuator screw to hold the top jaw securely in use.

Sufficient clearance is provided above the inclined T-portion so that, when the actuator screw is loosened, the top jaw can be tilted to disengage the radial stop so that the top jaw can be pulled off of the T-nut and removed from the master jaw. This can be accomplished in many instances by a single turn of the hold-down screw. Under these circumstances, the jaw can be removed and replaced in as little as 60 seconds. There are no parts that can be easily lost or misplaced. Thus, it is feasible for short production runs to have a different set of jaws for each job thus eliminating the need to test for position and runout each time the jaws are changed. Contrariwise, the top jaws can be mounted on and fixed securely to the master jaws by a simple turn or two on the T-nut screw.

DESCRIPTION OF THE DRAWINGS

FIG. 5 is an enlarged, fragmentary, transverse sectional view taken on the line 5—5 of FIG. 4;

FIG. 6 is a fragmentary sectional view similar to FIG. 4 but showing the top jaw adapted for internal chucking;

FIG. 7 is a view similar to FIG. 4 but showing the top jaw in the form of a jaw blank and mounted for external chucking on a conventional scroll chuck of the type having serrated master jaws;

FIG. 8 is a view similar to FIG. 7 but showing the jaw mounted for internal chucking; and FIG. 9 is a view similar to FIG. 7 but showing the top jaw adapted for use with a conventional chuck of the type having step-along master jaw serrations.

DESCRIPTION OF THE PREFERRED EMBODIMENT

Figure 1:
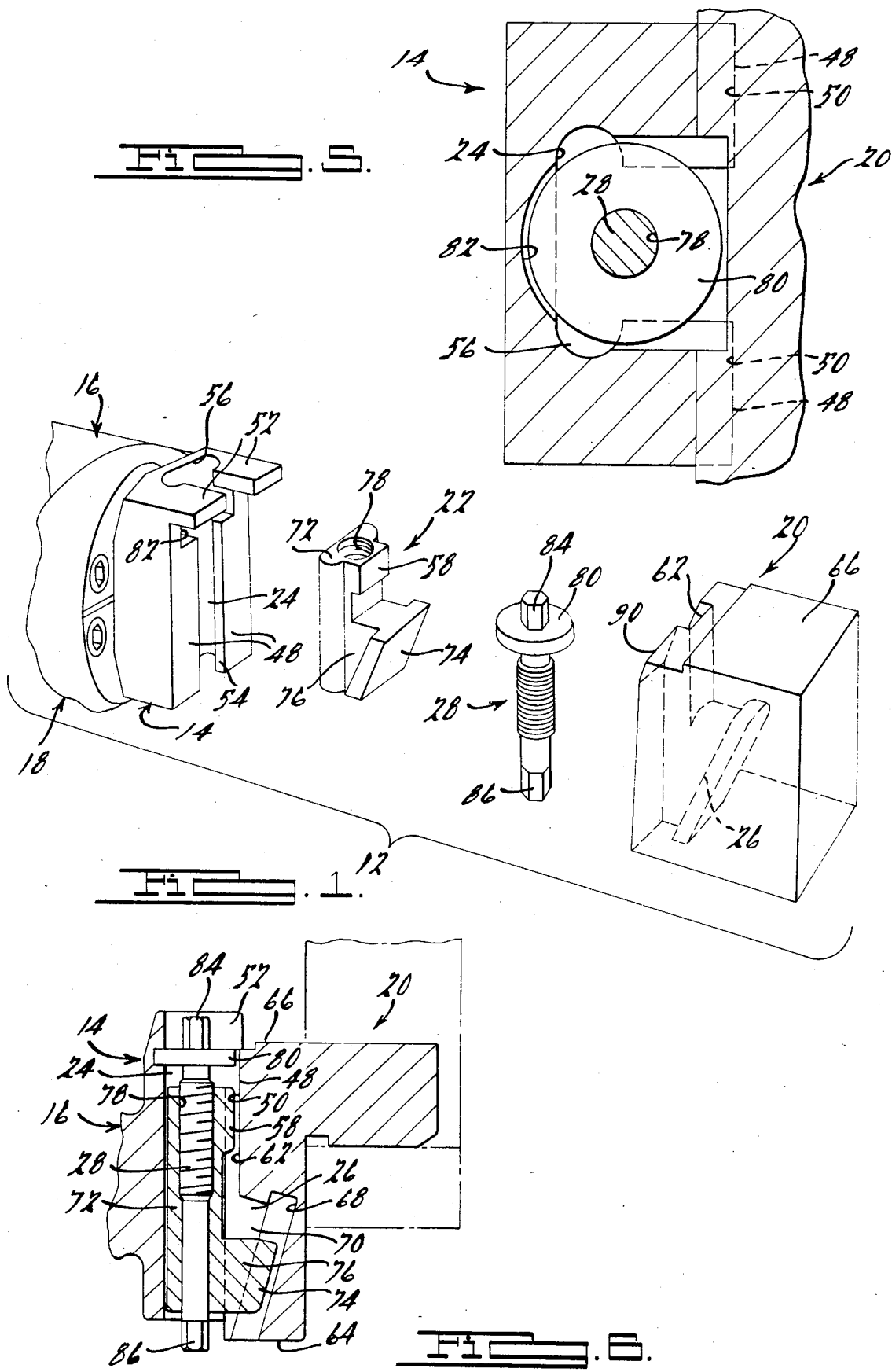
FIG. 1 is an exploded perspective view of a jaw assembly embodying the invention showing the master jaw mounted on the jaw actuator of a Woodworth ball-lok chuck which is one form of work holding chuck with which the jaw mounting of this invention is adapted to be used.

In the drawing, wherein for the purpose of illustration is shown a preferred embodiment of the invention, the numeral 12 designates the jaw assembly of this invention shown in exploded perspective view in FIG. 1. More particularly, the jaw assembly 12 comprises a master jaw 14 that is mounted on and preferably is formed integrally or in one piece with the jaw actuator 16 of a conventional chuck such as the one shown in FIG. 2 and designated generally by the numeral 18; a top jaw 20 (shown as a jaw blank in FIG. 1 and other views of the drawing); a T-nut 22 that interfits with T-slots 24 and 26 in the master and top jaws; and an actuator screw 28 threaded into the T-nut and mounted for turning or rotational movement but restrained against axial movement in the master jaw.

Figure 2:
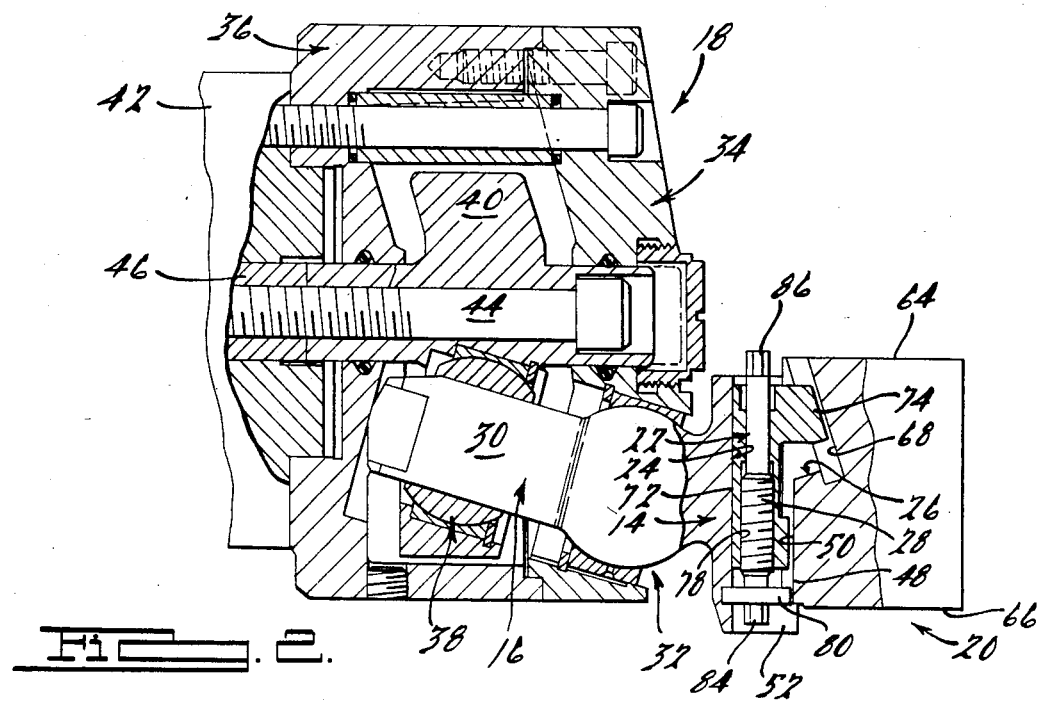
FIG. 2 is a longitudinal sectional view of the chuck showing the jaw assembly of this invention mounted thereon.
Figure 3:
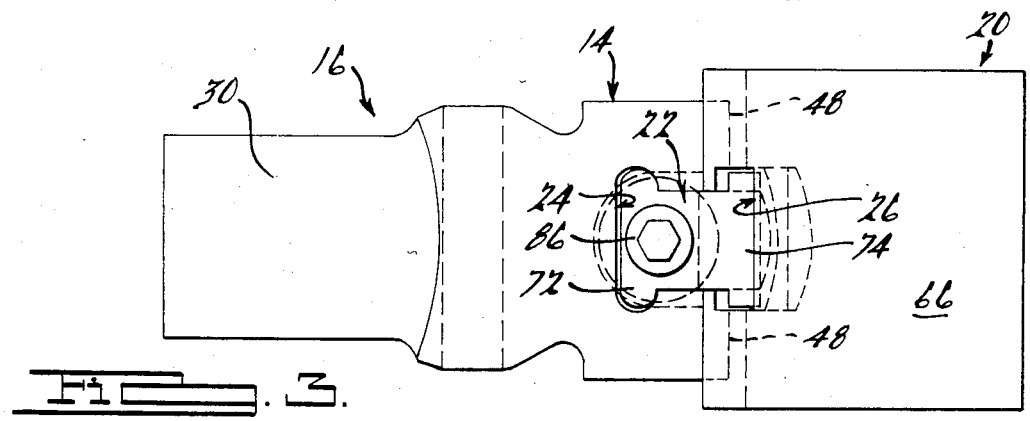
FIG. 3 is a rear or outer elevational view of the jaw assembly and jaw actuator.

In FIGS. 1–6, the jaw assembly 12 of this invention is shown on and in operative association with a work holding chuck of the type known in the trade as a Woodworth Universal Ball-Lok chuck. A chuck of this type is disclosed in U.S. Pat. No. 3,069,181 which was filed Aug. 3, 1961 in the names of George Hohwart and Paul Toth as joint inventors, and was issued Dec. 18, 1962 and assigned to the same assignee as this application. Since the construction and operation of the patented chuck is disclosed in detail in the patent document, it is not necessary for a complete description and understanding of the jaw mounting of this invention to repeat the description of the chuck in this application; and the disclosure of the patent therefore is incorporated by reference herein. Suffice it to say that the patented chuck has three jaw actuators 16 in the form of rocker arms 30 (only one of which is shown in FIG. 2) arranged concentrically about the chuck axis and spaced equidistantly with respect to each other. The three rocker arms 30 are identical in construction and operation and each is swiveled at 32 intermediate the ends thereof on the front cover plate 34 of the chuck body 36. The inner or rearward ends of the rocker arms 30 carry slidable swivel mountings 38 and are connected by the latter to a jaw actuator 40. In the particular construction here shown by way of example, the chuck body 36 is mounted on and rotatably driven by the lathe spindle 42; and the jaw actuator 40 is connected by a screw 44 to a drawbar 46 that extends axially through the spindle. The drawbar, in turn, is connected at the rearward end thereof to a power cylinder (not shown).

In operation, reciprocation of the jaw actuator 40 slides the rear swivel mountings 38 back and forth on the rocker arms 30. The front swivel mountings 32 are spaced equidistantly radially from the rotational axis of the chuck as are the rear swivel mountings 38; but the radial spacing of the front swivels is different from the radial spacing of the rear swivels 38. Consequently, sliding movement of the rear swivel mountings 38 on the rocker arms 30 by reciprocation of the actuator 40 and the drawbar 46 causes the rocker arms to pivot in the front swivel mountings 32 and work holding jaws 20 on the outer or forward ends of the rocker arms to move radially with respect to the chuck axis into and out of clamping engagement with a workpiece disposed centrally of the jaws.

In FIG. 2 of this application and in FIG. 1 of the patent drawing, the rear swivel mountings 38 are spaced a lesser distance from the chuck axis than the front swivel mountings 32 so that retraction of the actuator 40 rocks the jaws 20 radially inwardly into clamping engagement with a workpiece disposed centrally on the jaws; and, contrariwise, forward movement of the actuator 40 rocks the jaws 20 radially outwardly to release the workpiece. Thus, the rocker arm arrangement shown in FIG. 2 of this application adapts the chuck for external clamping. On the other hand, if the rear swivel mountings 38 are spaced a greater distance from the chuck axis than the front swivel mountings 32, as shown in FIG. 5 of the '181 patent, retraction of the actuator 40 moves the jaws 20 radially outwardly to clampingly engage the work and forward movement of the actuator rocks the jaws 20 radially inwardly to release the work. Thus, the rocker arm arrangement last described adapts the chuck for inernal clamping. In many chucks of this type, it is possible to change from internal clamping to external clamping, or vice versa, simply by turning the rocker arms 180° and substituting a different size actuator.

From the foregoing, it will be readily apparent that, in this form of the invention, the jaw assemblies 12 are identically mounted on the rocker arms 30 regardless of whether the chuck is adapted for external or internal clamping; and it is a feature of the invention that, if the rocker arms cannot be simply reversed as suggested above, the chuck can be modified for internal clamping to external clamping simply by reversing the rocker arms and changing actuators as described above or at most by replacing the front plate assembly and the actuator 40, and in either event, replacement of the top jaw members 20. Manifestly, however, it is necessary most often in the use of the chuck simply to replace the top jaw members 20 in order to adapt it to a different diameter workpiece or to a different shape or form of workpiece. In this connection, it will be appreciated also that, in use in normal operation of the chuck, the jaws 20 are moved radially only a sufficient distance to clamp and release the workpiece and to permit the latter to be loaded and unloaded when the jaws are released or open. Thus, in order to adapt the chuck for a different diameter or form of workpiece, the top jaws only must be replaced; and since the need to do this may occur relatively frequently, it is particularly advantageous to be able to make the replacement essentially quickly. As suggested, the top jaw mounting 20 embodying the present invention achieves this advantage in a novel and effective manner and it further permits the changeover to be accomplished in a manner that assures secure retention and accurate positioning of the top jaws at each replacement.

As clearly shown in the drawing, the master jaw 14 is formed with a flat top surface 48 that seats the top jaw 20; and the latter is formed with a flat bottom surface 50 that seats on and solidly engages the top of the master jaw. Thus, the top jaw 20 is free to slide longitudinally of the master jaw 14 radially of the chuck within limits in its radial outer movement defined by an upstanding ledge or stop 52 formed integrally on the master jaw at the outer end of the supporting surface 48. The master jaw T-slot 24 is conventional in many chucks and is disposed medianly of the top surface 48. Both the stem portion 54 and the head portion 56 of the T-slot 24 extend longitudinally entirely through the master jaw. Thus, in this form of the invention, the T-slot 24 opens through both the inner and outer ends of the master jaw including the stop 52 and the head portion thereof extends parallel to the top surface 48 and at right angles to the rotational axis of the chuck.

The bottom face 50 of the top jaw 20 is formed with a shallow groove or way 62 that is disposed medianly thereof and through ends 64 and 66. Also, the groove 62 complements and is essentially the same width as the stem portion 54 of the master jaw T-slot 24. On the other hand, the inclined T-slot 26 extends from the end 64 longitudinally only part way through the top jaw 20, as perhaps best shown in FIG. 6; and the head portion 68 of the T-slot is inclined angularly radially inwardly and axially rearwardly of the top jaw and in converging relation with respect to the bottom mounting surface 50 thereof. The stem portion 70 of the T-slot 26 preferably is the same width as the bottom groove 62.

The double T-nut 22 has bottom and top head portions 72 and 74 that interfit with the head portions 56 and 68 of the T-slots 24 and 26, respectively; and the two head portions 72 and 74 are joined by an interconnecting neck portion 76. As perhaps best shown in FIG. 1, the top head portion 74 is substantially shorter than the bottom head portion 72; and it extends from one end of the T-nut 22 about half the length thereof. A guide member 58 of the same width as the neck portion 76 is disposed at the end of the T-nut remote from the head portion 74. Both the neck portion 76 and the guide member 58 fit snugly but slidably in the stem portions 54 and 70 of the T-slots so as to locate and guide the top jaw centrally on the rocker arm 16 and on the seating face 48 of the master jaw 14. To this end, the top T-nut head portion 74 has the same angle of inclination with respect to the bottom head portion 72 that the head portion 68 of the top jaw T-slot has with respect to the head portion of the master jaw T-slot 24. Thus, when the double T-nut 22 is moved radially outwardly with respect to the master and top jaws 14 and 20, the undersurfaces of the two head portions 72 and 74 define oppositely facing pressure surfaces that seat or tighten against confronting shoulders defined by the head portions of the T-slots 22 and 24 in which they travel and the wedging action resulting from the inclined orientation of the two head portions 68 and 74 exerts a component of force that slides the top jaw 20 radially outwardly against the stop 52 and simultaneously draws the top jaw axially rearwardly solidly against the supporting top surface 48 of the master jaw. As suggested, movement of the top jaw 20 back and forth on the master jaw 14 is confined and guided by the neck portion 76 of the T-nut and the guide member 58.

As indicated previously, movement of the double T-nut 22 is accomplished according to the present invention by the actuator screw 28 that extends longitudinally through and is in threaded engagement with an internally threaded hole 78 in the T-nut. A radial flange or collar 80 formed on the actuator screw 28 adjacent one end thereof is received in a transverse slot 82 formed in the master jaw 14 at opposite sides of the T-slot stem portion 54 immediately inwardly of the stop 52. Thus, the screw 28 is free to turn or rotate relative to the master jaw 14; but it is captured or confined against longitudinal movement so that rotation of the screw in one direction or the other causes the T-nut to move either inwardly or outwardly in the T-slots 24 and 26. When the actuator screw 28 is rotated in a direction to move the T-nut 22 in the T-slots radially outwardly with respect to the chuck axis, it also acts initially to move the top jaw 20 radially outwardly on the master jaw 14 and against the stop 52. When this occurs, continued turning of the actuator screw 28 simply tightens the head portions of the T-nut against the T-slots 24 and 26 and presses the top jaw 20 simultaneously radially outwardly against the stop 52 and axially rearwardly against the master jaw 14. Thus, the stop 52 positions the top jaw 20 radially on the master jaw 14 and also holds it securely in its located position when the jaws are moved into clamping engagement with a workpiece in the chuck. To assure secure retention of the top jaw 20 on the master jaw 14, the angle of inclination of the T-nut head portion 74 and the head portion of the T-slot 26 in which it travels preferably is disposed at or substantially at the locking angle of the metal from which the parts are made. In the case of tool steel normally used in the manufacture of these parts, the locking angle is substantially 16°–18°.

The actuator screw 28 preferably extends away from the threaded section thereof beyond the radial flange 80 and the projecting portion is formed with angularly related, hexagonal peripheral faces 84 that permits the screw to be readily turned by a conventional wrench such as a socket wrench or the like. The opposite end of the actuator screw 28 extends beyond the threaded portion of the shank and the extremity thereof is formed also with angularly related hexagonal faces 86 that serve the same purpose as the faces 84 at the other end of the screw. In this connection, it will be observed that the actuator screw 28 is of sufficient length so that one end thereof is disposed adjacent the radially outer end of the master jaw 14 and the other end thereof is disposed inwardly of the master jaw. As a result of this particular construction and arrangement of parts, both ends of the actuator screw 28 are readily accessible for actuation by a wrench regardless of whether the chuck is in the external chucking mode shown in FIG. 2 or the internal chucking mode shown in FIG. 6.

Figure 4:
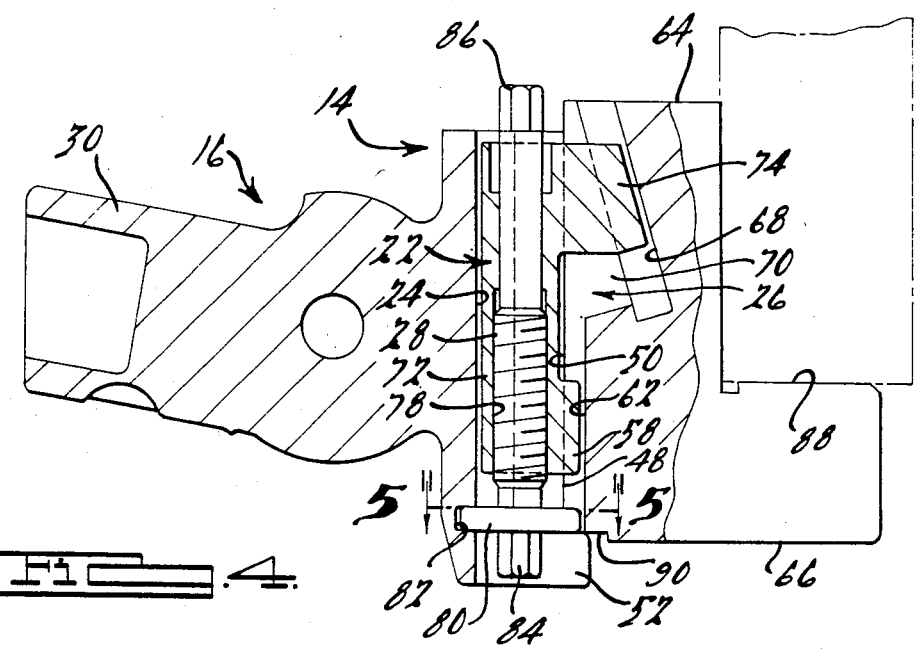
FIG. 4 is a side view, showing parts in elevation and parts in section for clearness of illustration, of the jaw assembly and jaw actuator with the top jaw adapted for external chucking of a workpiece.

The top jaws 20 normally are made initially as a solid block or jaw blank, as shown in FIG. 2 for example, and the jaw blank is recessed as at 88 (FIG. 4) to accommodate the particular workpiece. In this connection, it is contemplated that the recess 88 be adapted to engage the part directly, as shown in FIG. 4, or it may be provided according to conventional practice with work grips of the type shown in U.S. Pat. No. 3,459,433, for example.

After the jaw blank has been cut away or recessed to accommodate the work, the radial or rear face of the jaw that engages the stop 52 may be recessed or beveled as shown at 90 to position the clamping surface of the jaw precisely with respect to the rotational axis of the chuck.

In practice, the top jaw 20 can be easily and quickly released for removal from the master jaw 14 by a simple rotational movement of the actuator screw 28. As soon as the screw is loosened, the inclined top head portion 74 of the double T-nut 22 moves away from the surface of the T-slot 24 normally engaged thereby in the normal use of the chuck; and, as the T-nut advances in the slot, the clearance normally provided above the head portion 74 permits the radially outer end of the jaw to be lifted or tilted away from the master jaw sufficiently to clear the stop 52 so that the top jaw can be pulled off of the inclined T-nut head. If necessary or desirable, the outer bottom corner of the top jaw can be beveled, as shown at 90 in FIG. 1, to facilitate disengagement thereof from the stop 52 and removed from the master jaw. Manifestly, after the top jaw 20 has been removed in the manner described, a substitute jaw can be mounted in its place and securely attached to the master jaw by reversing the operations required for removal of the jaw. Again, only a simple turn or two of the actuator screw 28 is required to attach the substitute top jaw 20 securely on the master jaw 14; and, once the actuator screw has been tightened to secure the substitute top jaw, the latter will be held precisely in the desired location position on the master jaw until the actuator screw is again loosened.

While the top jaw mounting of this invention is primarily adapted and pre-eminently suited for use on the Woodworth Universal Ball-Lok chuck, as described above, it is readily adaptable also to other conventional types of chucks such as power or scroll chucks having serrated master jaws of the type shown in FIGS. 7 and 8. In this form of the invention, many of the parts are the same or similar to corresponding parts described in detail with reference to the first form of the invention shown in FIGS. 1–6, and corresponding numerals therefore are used to designate corresponding parts of the two forms. In this type of chuck, the master jaws 92 are moved radially of the chuck body (not shown) under power in any suitable or conventional manner and the top surfaces of the jaws are formed with transverse serrations 94. Only one jaw is shown in the drawing, but it will be readily appreciated that the type of chuck referred to has a plurality of chuck jaws (usually three) arranged concentrically about the chuck axis and in equi-spaced relation with respect to each other, similarly to the chuck shown in FIGS. 1-6. In these chucks, each master jaw 92 is conventionally provided with a radial T-slot 96 having the usual head portion 98 and neck portion 100 that opens through the top surface 102 of the master jaw as in the Ball-Lok chuck.

In order to adapt the master jaw 92 for use with a top jaw embodying the present invention, it is only necessary to mill or otherwise form a transverse slot 104 adjacent the outer end 106 of the jaw to accept and capture the radial flange 108 of an actuator screw 110. The latter is similar to the actuator screw 28 described in connection with the first form of the invention except that it is formed with only a single wrench receiving terminal portion 112 at the flange end thereof. As shown in the drawing, the T-slot 96 opens through the outer end 106 of the master jaw 92 so that the bottom head portion 72 of the double T-nut 22 can be inserted into the T-slot from the outer end of the master jaw with the neck portion 76 of the T-nut in the stem portion 100 of the T-slot 96 and the upper head portion 74 of the double T-nut spaced above the serrated top surface 102 of the master jaw. A top jaw 20 similar to the one previously described except for the provision of a master key 114 recessed into the undersurface thereof behind the inclined T-slot 26. The master key has bottom serrations 116 that interfit with the master jaw serrations 92 and it is detachably fastened to the top jaw 20 by a screw 118.

From the foregoing, it will be readily appreciated that the top jaw 20 can be mounted on the master jaw 92 as in the form of the invention first described. As previously, the actuator screw 110 is threaded into an internally threaded hole 78 in the double T-nut 22 from the radially outer end of the T-nut; and the top jaw 20 is mounted on the master jaw 92 by sliding the top head portion 74 of the double T-nut 22 into the inclined slot 26 of the top jaw and engaging the serrations 116 of master key 114 with the serrations 94 of the master jaw 92. Manifestly, in this type of chuck, the top jaw 20 can be approximately positioned on the master jaw 92 within incremental distances determined by the spacing of the serrations 94 and 116.

In use, the master jaw 92 is moved in the conventional manner to clamp and release a workpiece in the chuck. When the master key serrations 116 are interengaged with the jaw serrations 94, tightening of the actuator screw 110 pulls the upper head portion 74 of the T-nut 22 against the bottom of the T-slot head portion 68 to lock the top jaw 20 securely in the selected adjusted position on the master jaw 92. Here again, the locking angles of the head portion 74 and the T-slot head portion 68 mutually cooperate with the lead angle of the screw thread that interconnects the T-nut 22 and the actuator screw 110 to hold the top jaw 20 securely on the master jaw 92. However, a turn or two of the actuator screw 28 in a direction to loosen the double T-nut 22 and advance the top head portion 74 thereof in the inclined T-slot head portion 68 permits the outer end of the top jaw 20 to be lifted sufficiently to disengage the master key serrations 116 from the master jaw serrations 94 so that the master jaw 20 can be pulled radially outwardly off of the T-nut 22. A substitute top jaw adapted for a different size or form of workpiece can then be slipped onto the projecting top head portion 74 of the T-nut 22, the master key of the substitute jaw engaged with the master jaw serrations 94 in the desired radially adjusted position of the top jaw, and the latter locked securely in place by turning the actuator screw 110 to tighten the T-nut head portion 74 in the top jaw T-slot head portion 68.

In FIG. 7, the top jaw 20 is adapted for external chucking. This requires that the inclined T-slot 26 open through the radially inner end of the top jaw, that the master key 114 be disposed behind or at the radially outer end of the T-slot 26, and that the double T-nut 22 be disposed with the outer head portion 74 thereof at or adjacent to the inner end of the master jaw and radially inwardly of the master key 114.

In order to adapt the chuck for internal clamping, it is necessary to reverse the top jaw 20 and the double T-nut 22, as shown in FIG. 8. In the case of internal chucking, however, it is desirable to have left hand threads on the actuator screw 110 and in the double T-nut 22 so that the actuator screw is turned clockwise in the normal manner for locking the top jaw 20 on the master jaw 92.

FIG. 9 shows the top jaw mounting arrangement of this invention adapted for use with a conventional chuck of the type having master jaws 120 formed on the outer faces thereof with step-along serrations 122. This form of chuck and jaw mounting is similar to the one shown in FIGS. 7 and 8 and the same numerals therefore are used to designate corresponding parts or substantially corresponding parts in the two structures. The serrations 122 extend transversely of the master jaw top surface in the same manner as the serrations 94 shown in FIGS. 7 and 8. However, in the type of chuck shown in FIG. 9, the serrations 122 conventionally are V-shaped with the individual serrations usually spaced approximately 1.5 mm apart and the surfaces of the individual serrations disposed at an included angle of approximately 60°. When adapting the top jaw mounting of this invention to the type of chuck involved here, the bottom face of the top jaw 20 is serrated similarly to the top surface of the master jaw 120 so that the entire mating surfaces of the two jaws are utilized to hold the top jaw in its selected radially adjusted position. As a consequence, it is not necessary to use a master key such as the one shown at 114 in FIGS. 7 and 8. It will be readily apparent, however, that in the chuck shown in FIG. 9 the top jaw 20 is locked in a selected radially adjusted position on the master jaw 120 in the same manner as in the chuck shown in FIGS. 7 and 8 simply by tightening the actuator screw 110 in one direction to draw the upper head portion 74 of the double T-nut 22 tightly against the underlying surface of the T-slot head portion 68, and that the top jaw can be similarly released for replacement simply by rotating the actuator screw 110 a turn or two in the opposite direction to loosen the outer head portion of the T-nut sufficiently so that the serrations on the top jaw can be disengaged from the master jaw serrations and the top jaw tilted slightly and slipped radially off the T-nut. It will be apparent also that a substitute top jaw can be mounted on the master jaw simply by reversing the above operations. Manifestly, the chuck shown in FIG. 9 can be adapted for either internal or external chucking in the manner described for the chuck shown in FIGS. 7 and 8.

While it will be apparent that the invention herein described is well calculated to achieve the benefits and advantages as hereinabove set forth, it will be appreciated that the invention is susceptible to modification, variation and change without departing from the spirit thereof.

I claim:

1. In a rotatable work holding chuck of the type having a plurality of radially movable master jaws, and top jaws mounted on said master jaws, said top jaws and said master jaws having mutually engageable, radially extending, mating surfaces permitting adjustment of said top jaws on said master jaws radially with respect to the rotational axis of the chuck, the improvement comprising stop means on said master jaws engageable with said top jaws for limiting radial movement of the latter in one direction;

means defining axially forwardly first shoulder means on said top jaws;

means defining axially rearwardly facing second shoulder means on said master jaws, both of said shoulder means extending essentially radially with respect to the rotational axis of said chuck and at least said first shoulder means being inclined relative to said rotational axis and sloping axially rearwardly away from said stop means;

actuated means interconnecting said top jaws and said master jaws having pressure surfaces overlaying and engageable with both of said first and said second shoulder means, said actuated means being movable radially to bring said pressure surfaces into and out of engagement with said first shoulder means and operative to limit axial movement of said top jaws away from said master jaws; and actuator means coactive with said actuated means to move the latter positively radially in at least one direction to engage said pressure surfaces forcefully with said inclined first shoulder means, whereby said actuated means is operative in use to position said top jaws radially on said chuck by exerting a radial component of force against said first shoulder means in a direction to shift and hold said top jaws solidly against said stop means and simultaneously is operative to hold said top jaws securely on said master jaws by exerting an axial component of force axially against said first shoulder means in a direction to hold said mating surfaces solidly together.

2. The work holding chuck defined in claim 1, including means acting jointly between said actuator means and said actuated means and between said actuated means and said top jaws to maintain said top jaws in use releasably in their positions against said stop means and on said master jaws.

3. The work holding chuck defined by claim 1, including guide means interacting between said actuated means and said top jaws for controlling radial movement of the latter on said master jaws.

4. The work holding chuck defined by claim 1, wherein said actuator means is in the form of screw elements disposed radially of the chuck and extending through and in threaded engagement with said actuated means; and including means mounting said screw elements for rotation relative to said master jaws and said actuated means but preventing axial movement of said screw elements relative to said master jaws and said actuated means.

5. The work holding chuck according to claims 1 or 4, wherein said master jaws and said top jaws are formed respectively with radially extending T-slots disposed in confronting relation with respect to each other, wherein said first and second shoulder means are integral parts of said T-slots, and wherein said actuated means comprises double T-nuts having portions thereof in and interengaged with said shoulder means.

6. The work holding chuck defined by claim 4, wherein the taper angles of said first shoulder means are essentially locking angles, and wherein the locking angles of said other shoulder means are mutually cooperable with the helix angles of the screw threads that interconnect said screw elements and said actuated means to hold said top jaws in use securely on said master jaws.

7. The work holding chuck defined by claim 1, wherein the taper angles defined by the slope of said first shoulder means are essentially locking angles, and including means interacting with said actuated means and said actuator means and the locking angles of said first shoulder means for holding said top jaws securely in use but releasably on said master jaws.

8. The work holding chuck defined by claim 1, wherein said actuator means is operative to move said actuated means positively in a direction different than said one direction to disengage said pressure surfaces from said first shoulder means.

9. The work holding means defined by claim 8, wherein said actuated means has a side thereof facing away from said pressure surfaces, and including means providing limited clearance between the mentioned side of said actuated means and said top jaws, whereby said top jaws are movable axially relative to said master jaws within limits defined by said limited clearance to permit ready removal and replacement of said top jaws.

10. The work holding chuck defined by claim 9, wherein said stop means overlap and engage said top jaws at one end thereof, and wherein the amount of said overlap is less than the limited clearance between the mentioned side of said actuated means and said top jaws.

11. The work holding chuck defined by claim 9, wherein each of said stop means overlaps and engages a respective top jaw at one end thereof.

12. The work holding chuck defined by claim 1, wherein said stop means overlaps and engages said top jaws at one end thereof, and wherein said actuator means is operative to move said actuated means positively in a direction different than said one direction to disengage said pressure surfaces from said first shoulder means.

13. The combination of a top jaw adapted for mounting on a chuck master jaw and having a T-slot therein; and a double T-nut having a first T-portion for longitudinal sliding movement in said T-slot and a second T-portion extending from said top jaw for acceptance in a T-slot in said master jaw; said top jaw T-slot and the first T-portion of said T-nut being inclined and disposed in converging relation with respect to said second T-portion of said T-nut; and screw means extending longitudinally into and in threaded engagement with the second T-portion of said T-nut for driving the latter in said T-slots.

14. The combination of top jaw and T-nut defined by claim 13, including said screw means extending longitudinally through and having at least one end portion thereof projecting from the second T-portion of said T-nut; and an annular flange on and extending radially from the mentioned end portion of said screw means.

15. The combination of top jaw and T-nut defined by claim 13, further including wrench receiving means on both of the projecting end portions of said screw means.

16. A jaw mounting for rotatable work holding chucks of the type having a plurality of master jaws each provided with a T-slot therein, said mounting comprising a plurality of top jaws one for each of said master jaws each adapted to be mounted on a respective master jaw and having T-slots communicating with said first mentioned T-slots and extending in acute angular relation with respect thereto, double T-nuts each having head portions adapted to be slidably received in and complementing said first and second mentioned T-slots, respectively, and coactive therewith to hold mating surfaces of said jaws solidly together; and actuator means for slidably driving said T-nuts in said T-slots.

17. A jaw mounting according to claim 16 wherein said first and second mentioned T-slots extend in radially inwardly tapered relation with respect to each other, and wherein said actuator means are in the form of screws extending radially of and in threaded engagement with said T-nuts, whereby the taper angles of said T-slots and the lead angle of the screw threads are mutually cooperable to hold said top jaws securely on said master jaws.

18. A jaw mounting according to claim 17 including stop means for limiting movement of said top jaws in one direction on said master jaws, and wherein the taper angles of said T-slots are operative to move said top jaws against said stop means when said actuator means are tightened in said T-nuts.

* * * * *